(12) United States Patent
Terdy et al.

(10) Patent No.: US 10,569,800 B2
(45) Date of Patent: Feb. 25, 2020

(54) MONITORING SYSTEM FOR ELECTRIC POWER ASSISTED STEERING

(71) Applicant: TRW Limited, Solihull, West Midlands (GB)

(72) Inventors: Tamas Terdy, Birmingham (GB); Charles Mahendhrarajah, Gien (FR); Maciej Kudanowski, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 16/020,597

(22) Filed: Jun. 27, 2018

(65) Prior Publication Data

US 2019/0002013 A1    Jan. 3, 2019

(30) Foreign Application Priority Data

Jun. 29, 2017   (GB) .................................. 1710390.4

(51) Int. Cl.
*H02P 1/00*       (2006.01)
*B62D 5/04*       (2006.01)
(Continued)

(52) U.S. Cl.
CPC .............. *B62D 5/046* (2013.01); *B62D 6/001* (2013.01); *H02P 27/085* (2013.01); *H02P 29/026* (2013.01); *H02P 2201/03* (2013.01)

(58) Field of Classification Search
CPC .......... H02P 9/30; H02P 9/305; H02P 29/032; H02M 7/521
See application file for complete search history.

(56) References Cited

U.S. PATENT DOCUMENTS

| 2009/0167256 A1* | 7/2009 | Maddali ................... H02P 9/10 322/25 |
| 2013/0155729 A1 | 6/2013 | Lee |
| 2015/0130273 A1 | 5/2015 | Govindaraj et al. |

FOREIGN PATENT DOCUMENTS

| CN | 105717368 A | 6/2016 |
| DE | 112015005178 T5 | 8/2017 |

(Continued)

OTHER PUBLICATIONS

Patents Act 1977: Search Report under Section 17, Application No. GB1710390.4, dated Nov. 21, 2017.

(Continued)

*Primary Examiner* — Karen Masih
(74) *Attorney, Agent, or Firm* — MacMillan, Sobanski & Todd, LLC

(57) ABSTRACT

A monitoring system for an electric power-assisted steering system comprising a DC power supply; an inverter bridge including a plurality of bridge switches selectively connecting phases of a multi-phase electric motor to the DC power supply, the multi-phase electric motor being configured to provide power-assistance to a steering system of a vehicle; a bridge driver circuit for providing control signals to the inverter bridge; and a DC link capacitor circuit interposed between the DC power supply and the inverter bridge, the DC link capacitor circuit at least one DC link capacitor. The monitoring system comprises a monitoring circuit configured to monitor the integrity of the DC link capacitor circuit, and outputting a ripple value indicative of a ripple voltage in an output of the DC power supply; and comparison means for comparing the ripple value with at least one ripple parameter indicative of a fault in the DC link capacitor circuit and determining whether a fault is present.

15 Claims, 5 Drawing Sheets

(51) Int. Cl.
    *H02P 27/08*     (2006.01)
    *B62D 6/00*     (2006.01)
    *H02P 29/024*     (2016.01)

(56) References Cited

FOREIGN PATENT DOCUMENTS

| | | |
|---|---|---|
| EP | 2690452 A2 | 1/2014 |
| JP | 2005073375 A | 3/2005 |
| KR | 20170014070 A | 2/2017 |
| WO | 2016098410 A1 | 6/2016 |

OTHER PUBLICATIONS

Extended European Search Report, Application No. 18180962.5, dated Nov. 23, 2018.
EP Examination Report, Application No. 18180962.5 dated Oct. 16, 2019.

* cited by examiner

| Number of faulty capacitors (/6) | RMS measurement by monitoring circuit (RMS) (mv) | Ripple parameter (RMS>x) (mV) |
|---|---|---|
| 0 | 306.42 | n/a |
| 1 | 353.24 | 350 |
| 2 | 416.57 | 410 |
| 3 | 506.47 | 500 |
| 4 | 642.86 | 640 |
| 5 | 868.19 | 860 |
| 6 | 1270.00 | 1260 |

MONITORING SYSTEM FOR ELECTRIC POWER ASSISTED STEERING

CROSS-REFERENCE TO RELATED APPLICATIONS

This application is a national stage of Great Britain Patent Application No. 1710390.4, filed 29 Jun. 2017, the disclosures of which are incorporated herein by reference in entirety.

BACKGROUND OF THE INVENTION

This invention relates to improvements in electric power assisted steering systems.

It is known to provide electric power-assisted steering systems comprising a DC power supply, an inverter bridge including a plurality of bridge switches connected to a multi-phase electric motor, the inverter bridge being configured to provide power assistance to a steering system of a vehicle, a bridge driver circuit for providing control signals to the inverter bridge, and a DC link capacitor circuit interposed in the DC link between the rectifier of the DC power supply and the plurality of inverter bridges. The DC link capacitor circuit helps to smooth out transients that may be introduced during operation of the circuit, and otherwise smooth out ripple from the DC supply to the motor bridge.

The DC link capacitor circuit may include a single DC link capacitor or multiple DC link capacitors, which operate in order that the system is able to manage maximum ripple and survive high thermal stresses, for example during specific load profiles. High stress load profiles may include, for example, a parking cycle typical of the power profile required when a user is performing a parking manoeuvre. By using multiple DC link capacitors, the ripple current is shared between the capacitors—equally, in an ideal case—and thus there is less stress on each.

When one DC link capacitor in a set is faulty, or multiple capacitors are faulty, the remaining capacitors must compensate for this fault by taking on additional loading and thus stress. With additional stress on the remaining capacitors, each is more prone to developing faults itself. If each capacitor fails in turn, it is possible that the bridge circuit would at some point become incapable of driving enough current into the motor, the link voltage would become unstable, and the power-assistance to the steering system would be unable to function.

In power-assisted steering systems with dual-bridge architecture, whereby two lanes of an assistance system drive a dual-stator motor, there is more resistance to fault, due to one of the bridges being capable of operating the motor even if the other bridge were to fail. In normal operation, each bridge may use up to 100% of its possible power capability, although this is normally not the case in normal driving conditions, or at least not for prolonged periods of time. When one bridge fails, the other bridge may then be more likely to be required to use 100% or close to 100% of its possible power capability. In this situation, it is more important that a latent fault is recognised, due to the reliance on only one bridge to provide power assistance; it is important to know that the remaining bridge is capable of providing the desired assistance.

BRIEF SUMMARY OF THE INVENTION

In accordance with a first aspect of the invention, there is provided a monitoring system for an electric power-assisted steering system comprising: a DC power supply; an inverter bridge including a plurality of bridge switches selectively connecting phases of a multi-phase electric motor to the DC power supply, the multi-phase electric motor being configured to provide power-assistance to a steering system of a vehicle; a bridge driver circuit for providing control signals to the inverter bridge; and a DC link capacitor circuit interposed between the DC power supply and the inverter bridge, the DC link capacitor circuit at least one DC link capacitor; the monitoring system comprising: a monitoring circuit being configured to monitor the integrity of the DC link capacitor circuit, the monitoring circuit outputting a ripple value indicative of a ripple voltage in an output of the DC power supply; and comparison means for comparing the ripple value with at least one ripple parameter indicative of a fault in the DC link capacitor circuit and determining whether a fault is present.

By "integrity of the DC link capacitor circuit" it is meant the presence or absence of a fault in the circuit. By "fault", we mean any degradation in the DC link capacitor circuit that results in a loss of capacitance. Such a loss of capacitance may be due to a fault in a single capacitor or multiple capacitors. What is important is the total loss of capacitance of the DC link capacitance circuit rather than the individual loss of capacitance of any single capacitor within the DC link capacitor circuit.

By "DC link capacitor circuit" it is meant a capacitor bank that is located in the DC link and that provides smoothing of the current necessary to operate the inverter bridge. The capacitor bank includes one or more capacitors. These typically each are connected in parallel with each other to connect the positive and negative (or positive/negative and ground) of the DC link.

The monitoring system defined above therefore provides the ability to check for partial failure of the DC link capacitor circuit. In practical terms, it provides the ability to monitor the circuit in order that faults can be rectified or mitigated for, through maintenance or otherwise, before they become problematic to the operation of the electric power-assisted steering system. It may also be possible to alter operating characteristics of the system in order to prevent further failures within the DC link capacitor circuit.

The comparison means may form a part of a control circuit. The control circuit may therefore include a memory, which stores the or each ripple parameter. The comparison means may also be included with the monitoring means, in which case the monitoring means may include the memory.

To determine if a fault is present, the comparison means may determine if the ripple value matches or closely matches any of the stored ripple parameters, a fault being indicated if there is a match or close match. It may determine if the ripple value exceeds the lowest stored ripple parameter value, which is the ripple value that would correspond to only a single capacitor of the circuit being at fault.

The monitoring means may therefore determine if one or more of the capacitors has failed in an open circuit mode, and as such is not contributing to the energy storage of the DC link capacitor circuit, reducing the ability of the circuit to limit the ripple voltage.

The control circuit may be configured to update or otherwise modify the value of the or each ripple parameter according to parameters of the electric power-assisted steering system. Such parameters may include the phase current applied by the inverter bridge, the battery voltage, and/or the temperature of the system or select components of the system.

The control circuit may be configured to output signals to the bridge driver circuit that cause the bridge driver circuit to alter the control signals provided to the inverter bridge.

The at least one ripple parameter may include a first ripple parameter indicative of whether a fault is present that corresponds to a first predetermined loss of capacitance in the DC link capacitor circuit. The at least one ripple parameter may also include a second ripple parameter indicative of whether a fault is present that corresponds to a second predetermined loss of capacitance in the DC link capacitor circuit.

The or each predetermined loss of capacitance may be equivalent to the loss of capacitance of an integer number of the DC link capacitors.

The at least one ripple parameter may include a number of ripple parameters equal to a number of DC link capacitors in the plurality of DC link capacitors, each additional ripple parameter being indicative of a fault equivalent to the loss of capacitance of an additional one of the number of DC link capacitors.

The ripple monitoring means may include a true RMS-to-DC converter.

The ripple value may be proportional to an RMS value of the ripple voltage.

The or each ripple parameter may equate to a ripple value above which it can be determined that at least one capacitor is faulty.

In accordance with a second aspect of the invention, there is provided a method of determining an operational state of a motor drive circuit of the kind comprising: a DC power supply; an inverter bridge including a plurality of bridge switches selectively connecting phases of a multi-phase electric motor to the DC power supply, the multi-phase electric motor being configured to provide power-assistance to a steering system of a vehicle; a bridge driver circuit for providing control signals to the inverter bridge; a DC link capacitor circuit interposed between the DC power supply and inverter bridge, the DC link capacitor circuit including at least one DC link capacitor; the method comprising the steps of: a monitoring step of monitoring a ripple value indicative of a ripple voltage in an output of the DC power supply; a comparison step of comparing the ripple value with at least one ripple parameter indicative of a fault in the DC link capacitor circuit; and a fault determination step wherein, in the event that the ripple value is indicative of a fault in the DC link capacitor circuit, determining that a fault is present.

In accordance with a third aspect of the invention, there is provided an electric power-assisted steering system comprising: a DC power supply; an inverter bridge including a plurality of bridge switches for selectively connecting phases of a multi-phase electric motor to the DC power supply, the multi-phase electric motor being configured to provide power-assistance to a steering system of a vehicle; a bridge driver circuit for providing control signals to the inverter bridge; a DC link capacitor circuit interposed between the DC power supply and the inverter bridge, the DC link capacitor circuit including at least one DC link capacitor; and a monitoring system in accordance with the first aspect of the invention.

The electric power-assisted steering system may further comprise at least one additional inverter bridge for selectively connecting additional phases of a multi-phase electric motor to the DC power supply. The system may further comprise an additional bridge driver circuit for providing control signals to the additional inverter bridge, the additional bridge driver circuit receiving signals from the monitoring system.

The bridge driver circuit and/or additional bridge driver circuit may be configured to modify the control signals provided to the inverter bridge and/or the additional inverter bridge when it is determined by the monitoring system that a fault is present in the DC link capacitor circuit and/or the additional DC link capacitor circuit.

Each DC link capacitor circuit may be fed by a separate power filter, each power filter being interposed between the DC power supply and the respective DC link capacitor circuit.

In this way, a multi-stator multi-phase electric motor may be driven by the described apparatus. For example, a dual-stator electric motor can be driven via an inverter bridge configured to drive each stator. Use of a dual-stator electric motor may be advantageous as it provides a level of redundancy to the electric power-assisted steering system.

A single bridge driver circuit may drive two or more inverter bridges.

By using a bridge driver circuit that drives multiple inverter bridges in conjunction with a monitoring system that monitors the ripple in the voltage supplied to the inverter bridges, the inverter bridges can be independently controlled to mitigate for any faults in either inverter bridge. For example, if the monitoring circuit indicates that a large number of capacitors are faulty in one of the DC link capacitor circuits and that the inverter bridge may therefore not be able to operate at full capacity, more power can be directed through the other inverter bridge.

A single monitoring circuit may monitor each of the ripple values or multiple monitoring circuits may be used. Where multiple monitoring circuits are used, they may each be in communication with the control circuit or each other.

Multiple bridge driver circuits may be used, each of which may be centrally controlled by a control circuit or which may be in communication with each other in order to effect synchronised or collaborative control of the motor.

Other advantages of this invention will become apparent to those skilled in the art from the following detailed description of the preferred embodiments, when read in light of the accompanying drawings.

DETAILED DESCRIPTION OF THE INVENTION

Figure 1:
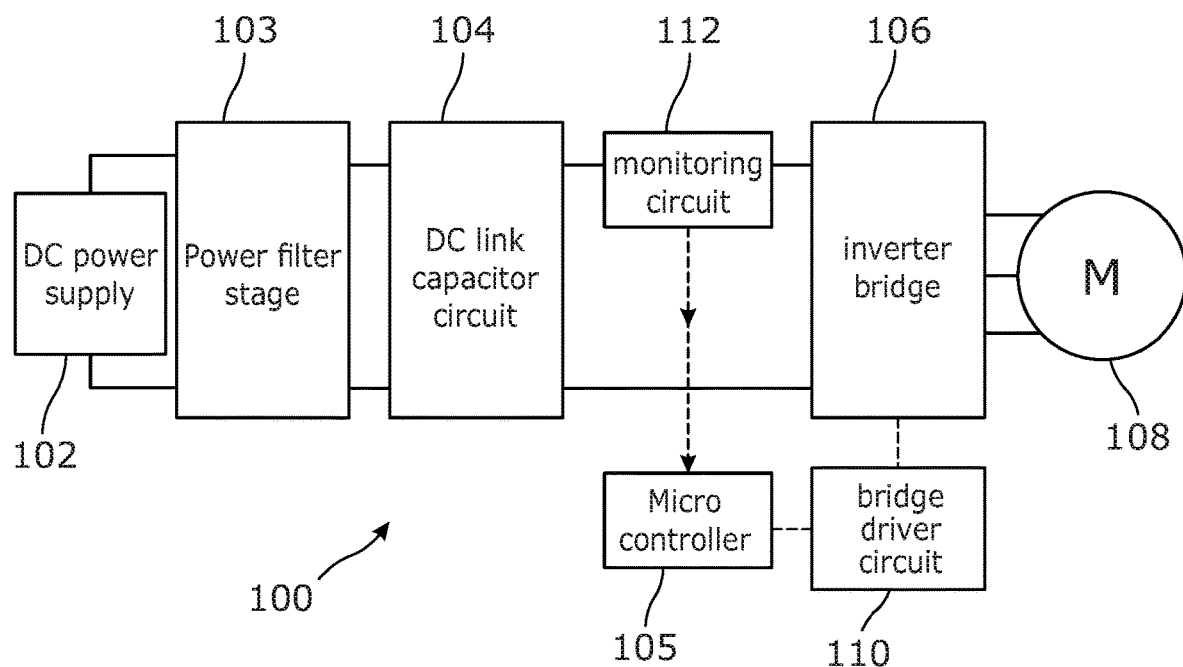
FIG. 1 is a circuit diagram of an embodiment of an electric power-assisted steering system in accordance with the third aspect of the invention including an embodiment of a monitoring circuit in accordance with the first aspect of the invention.

Referring firstly to FIG. 1, there is shown an embodiment of an electric power-assisted steering system 100. The electric power-assisted steering system 100 comprises a DC power supply 102, power filter 103, DC link capacitor circuit 104, micro controller 105, and an inverter bridge 106 driving a multi-phase electric motor 108. The multi-phase electric motor 108 provides electric power-assistance to a steering system of a vehicle (not shown). In addition to the above, the electric power-assisted steering system 100 also comprises a bridge driver circuit 110 that drives the inverter bridge 106 and a monitoring circuit 112 that monitors the voltage supplied to the inverter bridge 106.

The power filter 103 is interposed between the DC power supply 102 and DC link capacitor circuit 104, and acts to prevent unwanted frequencies propagating through the circuit.

Figure 2:
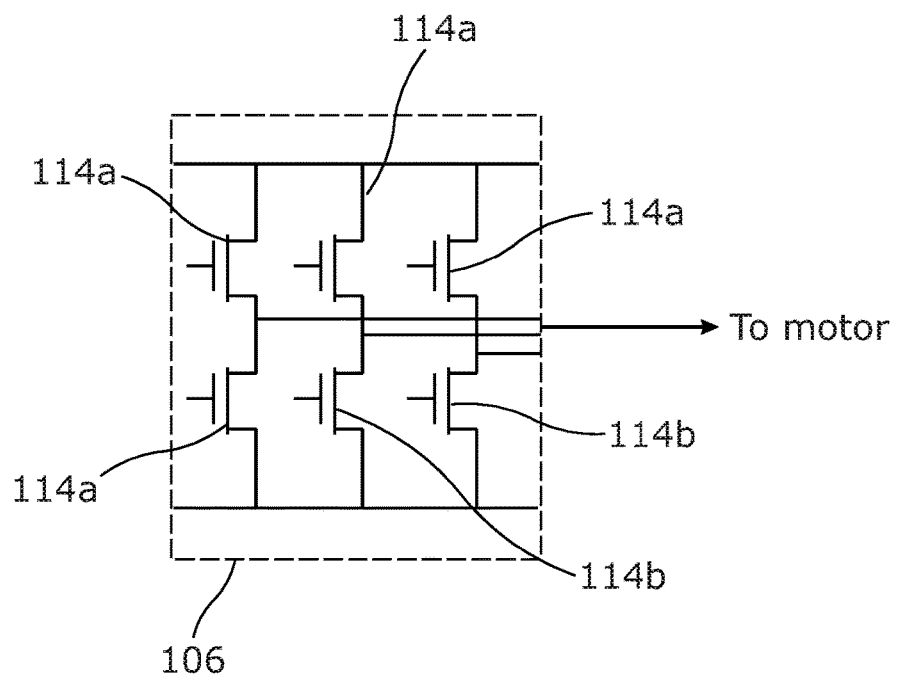
FIG. 2 is a detail view of the inverter bridge of FIG. 1.

The inverter bridge 106, shown in FIG. 2, includes a plurality of bridge switches 114. The bridge switches are arranged in a pair containing an upper bridge switch 114a and a lower bridge switch 114b, each pair of bridge switches 114 controlling the current flow to one phase of the multi-phase electric motor 108. In the present embodiment, the bridge switches 114 each include a MOSFET, the switching of which is controlled by signals from the bridge driver circuit 110. Thus, the bridge switches 114 may be switched on and off as necessary to provide the desired power to each phase of the multi-phase electric motor 108.

Figure 3:
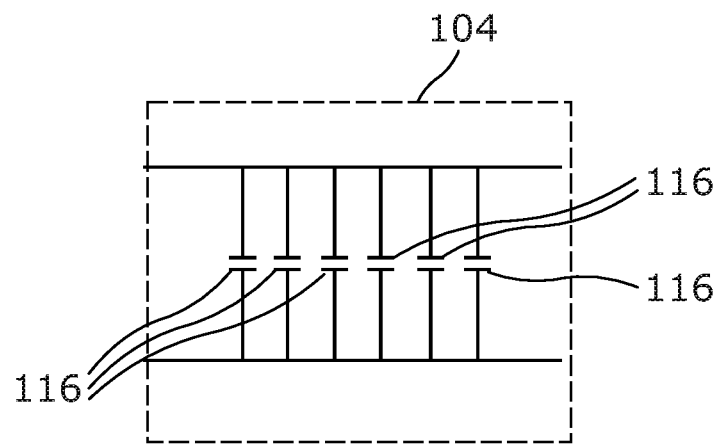
FIG. 3 is a detail view of the DC link capacitor circuit of FIG. 1.

When using an inverter to convert DC to AC, as in the present case, a resultant ripple current is drawn from the DC power supply 102. Because of this ripple current, ripple voltage may be formed in the voltage supplied to the inverter bridge 106. In order to combat this, as shown in FIG. 3, the DC link capacitor circuit 104 includes a number of capacitors 116, which provide the required ripple current hence reduce the ripple voltage supplied to the inverter bridge 106. In order to achieve the desired effect, a single capacitor 116 may be used. However, in the present embodiment six capacitors 116 are used in order to spread the load among many capacitors 116. As previously discussed, this also adds redundancy to the system 100.

The ripple voltage may be defined as a repeating fluctuation away from the baseline DC voltage provided by the DC power supply. This repeating fluctuation can be modelled as an AC voltage and therefore the ripple value may be, for example, the measured RMS value of the ripple voltage. This RMS value will change as the amplitude of the ripple voltage changes in response to a fault in one or more capacitors.

Ripple voltage may be affected by many attributes of the circuit, including the ripple current drawn by the inverter bridge, equivalent series resistance (ESR), total capacitance of the DC link capacitor circuit, the frequency of the ripple current, and the temperature. The ripple current drawn by the inverter bridge is proportional to the load and the frequency of the ripple current depends upon the switching frequency of the inverter bridge, i.e. the pulse width modulation (PWM) frequency.

Figure 4:
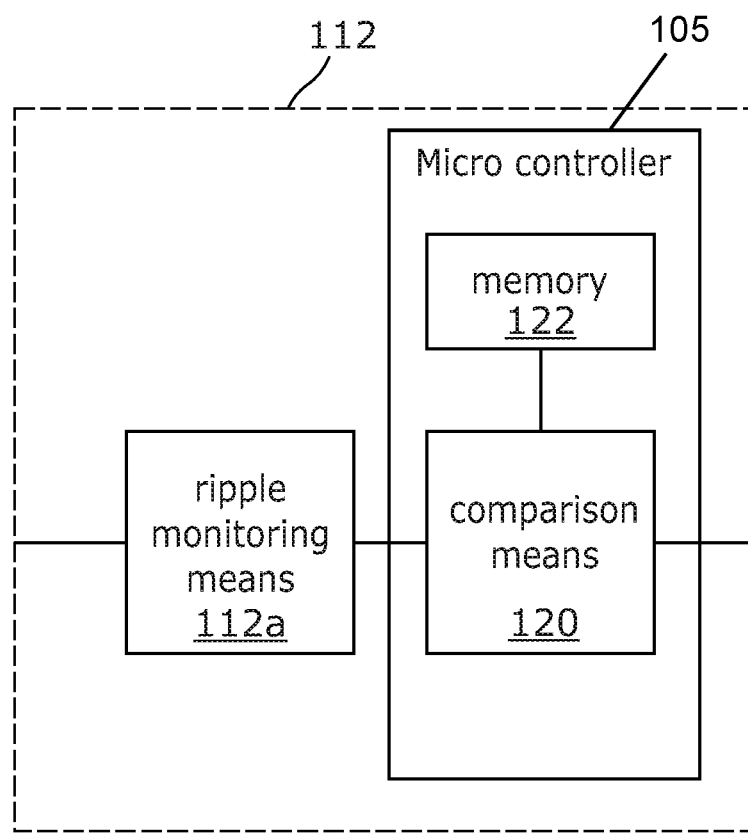
FIG. 4 is a detail view of the control circuit of FIG. 1.

The ripple generated in the circuit is detected by a ripple monitoring means 112a of the monitoring circuit 112, the output of which is fed to the t micro controller 105. The micro controller 105 comprises a comparison means 120. As shown in FIG. 4, a memory 122 may also be included, if necessary. The monitoring circuit 112 monitors the voltage supplied to the inverter bridge 106 for ripple. The size of the ripple is then compared in the comparison means 120 against at least one ripple parameter. The result of this comparison results in the monitoring circuit 112 determining whether or not a fault is present in the DC link capacitor circuit 104.

In the present embodiment and as shown in FIG. 3, there are a total of six DC link capacitors 116. Therefore, the monitoring circuit 112 includes six different ripple parameters. Each ripple parameter corresponds to a predetermined loss of capacitance in the DC link capacitor circuit equivalent to the failure of a DC link capacitor 116, i.e. a DC link capacitor 116 is no longer functioning. When a DC link capacitor 116 is faulty, the ripple value will rise accordingly. An example of how the monitoring circuit 112 functions will now be described, with reference to FIG. 4.

As an example, a ripple voltage indicative of a reduction in capacitance equivalent to the total failure of one capacitor may also be indicative of a 50% loss of capacitance of two capacitors or a 25% loss of capacitance of four capacitors. As such, the ripple voltage measurement is a measure of the total loss of capacitance rather than the specific failure of any single capacitor or combination of capacitors.

As stated previously, although six capacitors are shown in the present embodiment, this is not a limitation of the invention and any number of capacitors may be used. For example, a single capacitor may be used, or two, three, or four capacitors, or any other number of capacitors that is deemed preferable or necessary by the skilled person.

During normal usage, the ripple voltage RMS value will be below a predetermined value. This value will be stored in the memory 122 as a first ripple parameter. If the ripple rises to a value above the first ripple parameter then the comparison means 120 will indicate that there is a fault with one of the DC link capacitors 116. A second ripple parameter is stored that corresponds to a fault in two of the DC link capacitors 116. This second ripple parameter will be above that of the first ripple parameter, corresponding to a larger ripple value.

Further ripple parameters, e.g. third ripple parameter, fourth ripple parameter, fifth ripple parameter, and sixth ripple parameter, will indicate if additional DC link capacitors 116 are faulty, each subsequent ripple parameter corresponding to a loss of capacitance equivalent to the failure of an additional DC link capacitor 116.

As described, the ripple parameters may be simple values whereby if the ripple value is greater than each parameter the comparison means 120 indicates a fault with one or more DC link capacitors 116. Alternatively, it may be that the ripple parameters are each a range of values, whereby the ripple value must stay within such a range in order that a fault is not detected.

The control circuit may adapt the ripple parameters depending on various other parameters of the circuit and therefore the ripple parameters may not be fixed but may be dynamic. For example, increasing the phase current may increase the size of the ripple voltage without any loss of capacitance. As such, the ripple parameters should be adapted in order to take into account this natural increase in ripple voltage. The increase in ripple voltage may not be linear with the increase in phase current but may have a more complex relationship, which will be determinable by the skilled person. Other parameters that may be considered in order to dynamically alter the ripple parameters may include the actual battery voltage and the temperature of the circuits, for example. This is not an exhaustive list of the parameters that may be taken into account when dynamically altering the ripple parameters, and other parameters and their methods of measurement will be readily implemented by the skilled person.

The ripple parameters may be predetermined through testing and/or through a worst case analysis calculation, the calculation taking into account variations due to the tolerances of the circuit. Each design of electric power-assisted steering system 100 will have its own characteristic ripple dependent on the electrical characteristics of the components in the system 100 as well as the number and type of DC link capacitors 116 present in the DC link capacitor circuit 104. Because of this, testing will allow the ripple parameters of each system to be tuned to correspond to the failure of the capacitors 116 in the DC link capacitor circuit 104.

The monitoring circuit may, for example, utilise a True RMS-to-DC converter integrated circuit. Such a circuit is capable of measuring the RMS value of the ripple voltage. An example True RMS-to-DC converter integrated circuit is the AD8436 from Analog Devices. Although the present embodiment monitors the ripple voltage by monitoring RMS, alternative methods are possible such as peak-to-peak monitoring of the ripple voltage or any other known measurement of the ripple voltage, which will be known to the skilled person.

Figure 5:
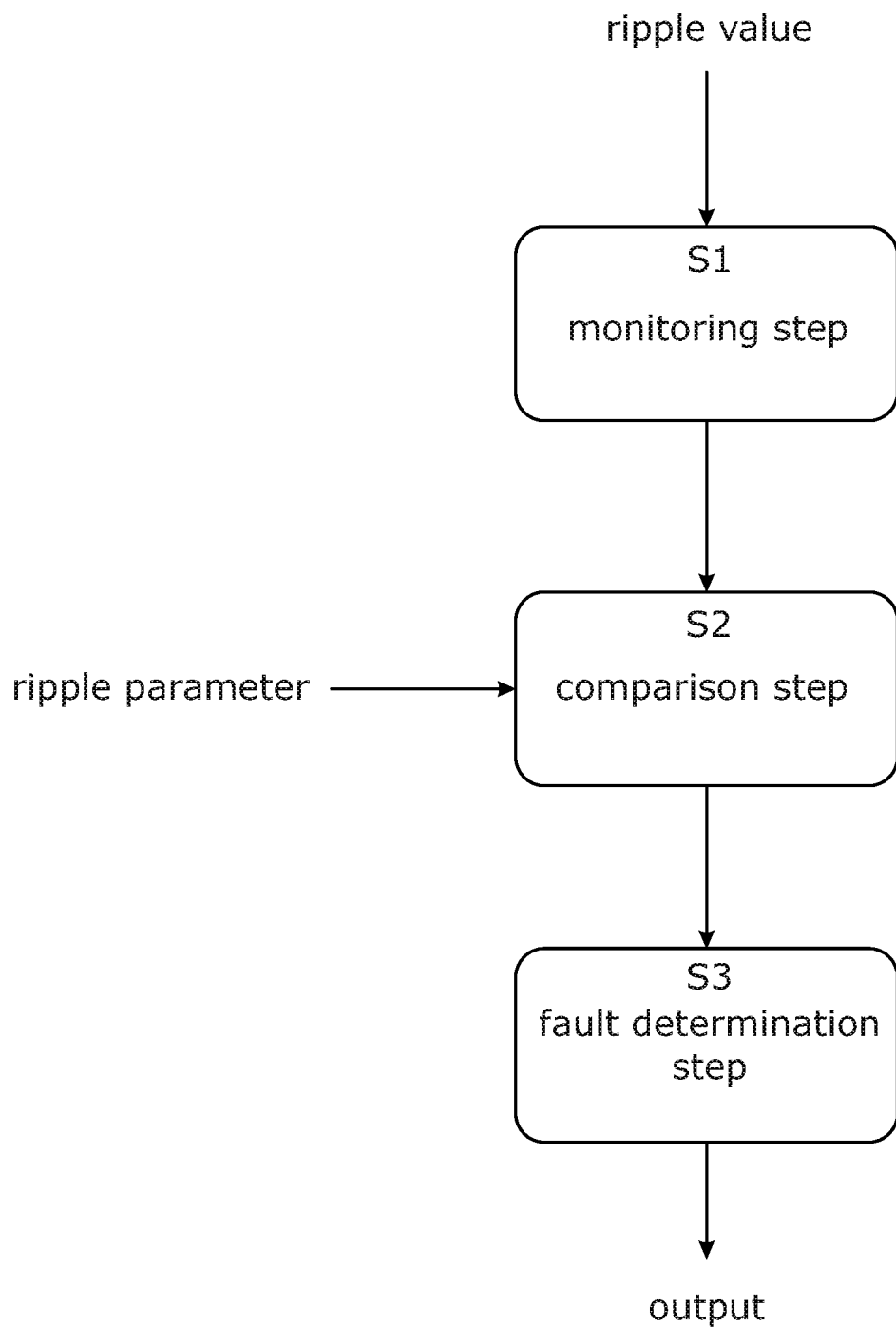
FIG. 5 is a depiction of a method in accordance with the second aspect of the invention.

In accordance with the above description, a method of determining an operational state of a motor drive circuit as described can be determined using a monitoring step S1, comparison step S2, and fault determination step S3, as shown in FIG. 5.

Firstly, the monitoring step S1 includes monitoring the ripple value that is indicative of a ripple voltage being supplied to the inverter bridge 106. This ripple value may be the ripple voltage itself or some other signal that is dependent upon the ripple voltage. This ripple value is then compared, in a comparison step S2, with one or more ripple parameters, which may be predetermined or calculated by additional circuitry, for example. In a fault determination step S3, it is then decided whether there is a fault with the DC link capacitor circuit 104 based on the result of the comparison.

Figure 6:
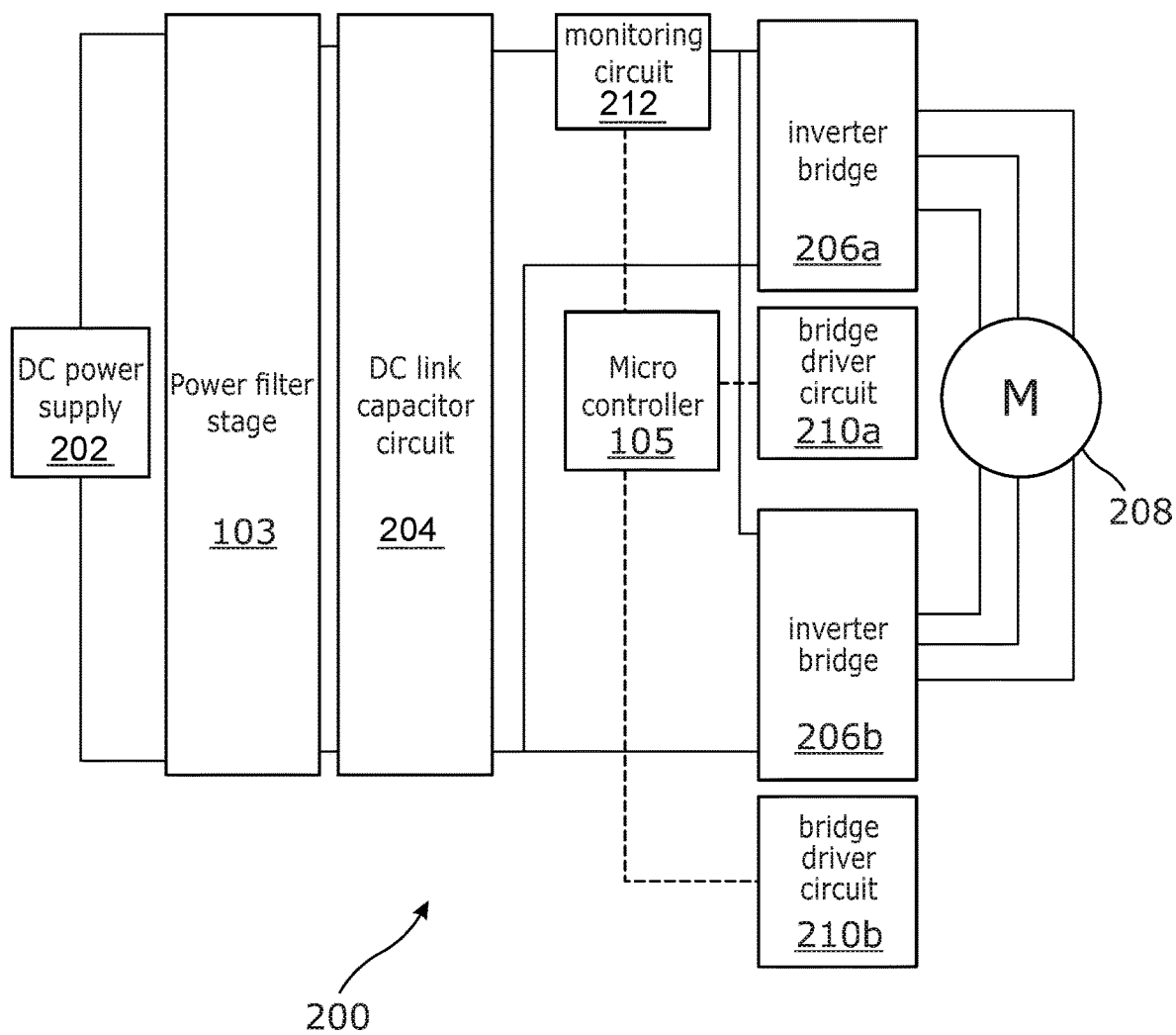
FIG. 6 is a circuit diagram of a second embodiment of an electric power-assisted steering system in accordance with the third aspect of the invention including a dual-stator electric motor.

A first exemplary circuit diagram for the driving of a dual-stator multi-phase electric motor 208 is shown in FIG. 6. Where appropriate, the same reference numerals that were used for FIG. 1 are used to show like components. The system 200 operates in a similar manner to that of FIG. 1, but expanded in order to drive both the first stator windings and the second stator windings of a dual lane motor. As such, two inverter bridges 206a, 206b are provided, and two bridge driver circuits 210a, 210b, one of which drives each lane of windings of the dual-stator motor 208. Each inverter bridge 206a, 206b is provided in a lane along with a monitoring circuit 212 and DC link capacitor circuit 204. Each lane is powered by the same DC power supply 202, although multiple power supplies may be provided and the lanes 224 separated accordingly.

Two bridge driver circuits 210a, 210b are provided that output signals to drive the switches of each inverter bridge 206. The bridge driver circuits 210 may therefore provide identical signals to each inverter bridge 206, although offset by the offset of the phase windings, in the case of a circuit that is operating as normal, or may vary the signals provided to each inverter bridge 206 in the event that a fault is detected in one or more of the DC link capacitors in the DC link capacitor circuits 204. Here, one bridge driver circuit is provided for each inverter bridge, and this can be scaled as necessary if more inverter bridges are present, such as where there are more windings in the motor. Alternatively, it is also possible to provide one bridge driver circuit that drives two or more inverter bridges.

Although depicted as separate monitoring circuits 212, for ease, a dual monitoring circuit may be used that monitors for ripple in the voltage supplied to each inverter bridge 206a, 206b. Whether a single monitoring circuit or multiple monitoring circuits are provided, the monitoring circuit(s) 212 will be in communication with the bridge driver circuit 210 in order that the bridge driver circuit 210 may modify the drive signals to the inverter bridges 206 accordingly.

A control circuit is shown that communicates with the bridge driver circuit 210 and monitoring circuits 212. Thus, central control of the system 200 is effected. In place of a dedicated controller, the monitoring circuits or bridge driver circuits may include the control circuit in addition to their internal controls.

The system of FIG. 6 can, of course, be expanded in order to drive a motor with further stators, as will be apparent to the person skilled in the art.

Figures 7, 8:
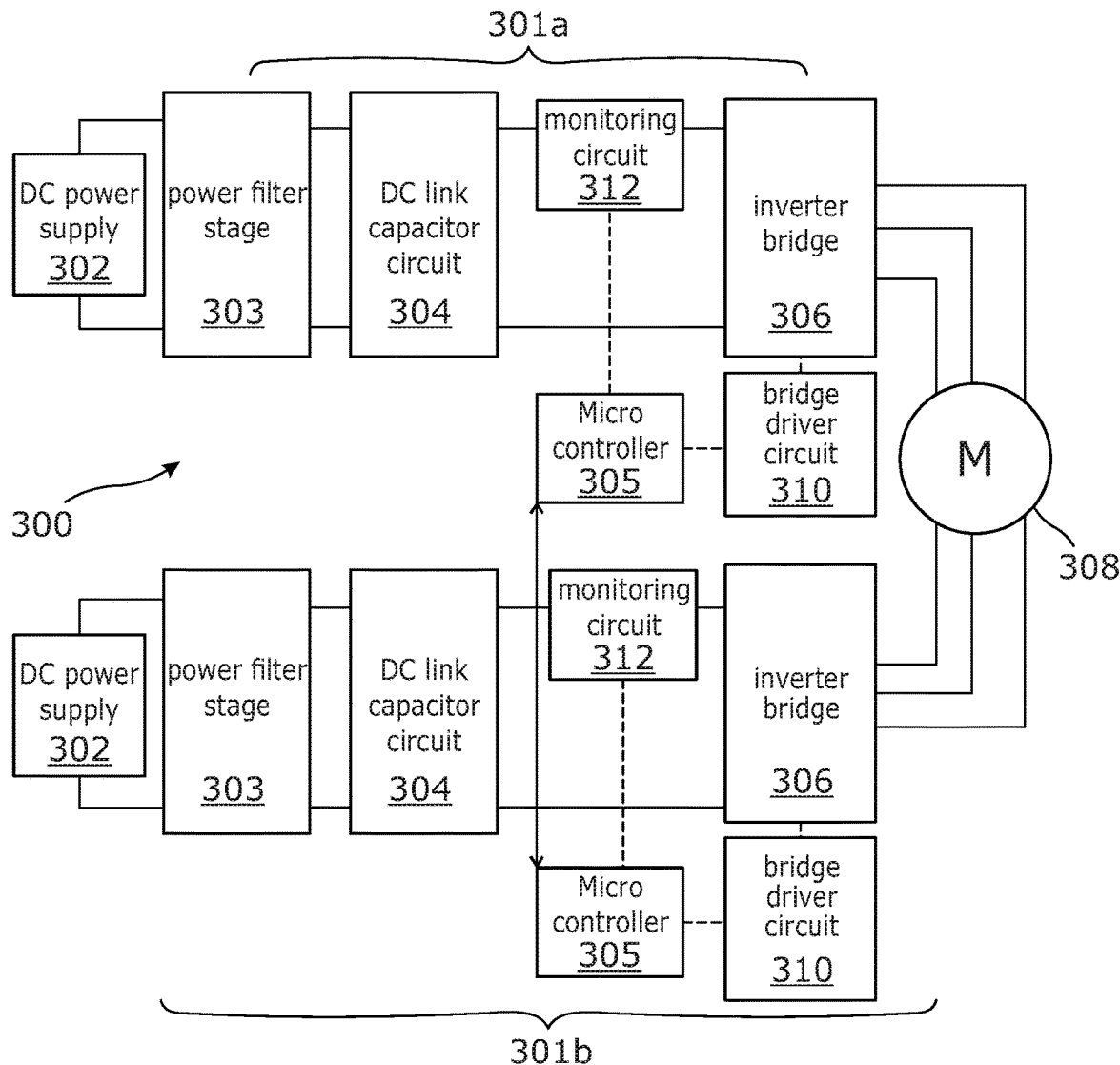
FIG. 7 is a table of example ripple values and ripple parameters.
FIG. 8 is a circuit diagram of a third embodiment.

An example of an alternative and more complex arrangement is shown in FIG. 8. In this example 300 a full dual lane system is provided for driving a motor that has two fully independent sets of phase windings 308. The two lanes may be identical, and each lane 301a, 302b as shown has its own power supply 302, power filter stage 303, DC link capacitor circuit 304, monitoring circuit 312, microcontroller 305, bridge driver circuit 310, inverter bridge 306 and so on. In effect each lane includes all of the features shown in the simple arrangement of FIG. 1. The parameters stored for each lane can be the same, but may be different for each lane. For instance, if the parameters are modified with temperature then different parameters may be used if the temperature of the DC link capacitors in each lane are different. As shown the microcontrollers communicate with each other but they may be fully independent.

In FIG. 7, examples of the number of faulty capacitors and resultant RMS measurements detected by the monitoring circuit are shown. From these measurements it is possible to determine possible limits of ripple parameters indicative of a fault in one or more capacitors. In the depicted example, the ripple value rising above the value of the ripple parameters will indicate a fault in one or more capacitors, as indicated by the table. Each additional ripple parameter is therefore selected to correspond to a loss of capacitance equivalent to the capacitance of one of the capacitors in the DC link capacitor circuit. The actual values of the ripple parameters and the RMS measurements will vary depending on the static and dynamic characteristics of the system.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A monitoring system for an electric power-assisted steering system, wherein the electric power-assisted steering system comprises a DC power supply, an inverter bridge including a plurality of bridge switches selectively connecting phases of a multi-phase electric motor to the DC power supply, the multi-phase electric motor being configured to provide power-assistance to a steering system of a vehicle, a bridge driver circuit for providing control signals to the inverter bridge, and a DC link capacitor circuit interposed between the DC power supply and the inverter bridge, the DC link capacitor circuit having at least one DC link capacitor, wherein the monitoring system comprises;

a monitoring circuit configured to monitor the DC link capacitor circuit, the monitoring circuit outputting a ripple value indicative of a ripple voltage in an output of the DC power supply; and comparison means for comparing the ripple value with at least one ripple parameter indicative of a fault in the DC link capacitor circuit and determining whether a fault is present.

2. A monitoring system according to claim 1, wherein the comparison means forms a part of a control circuit.

3. A monitoring system according to claim 2, wherein the control circuit includes a memory, which stores the or each ripple parameter.

4. A monitoring system according to claim 2, wherein the control circuit is configured to update the or each ripple parameter according to parameters of the electric power-assisted steering system.

5. A monitoring system according to claim 2, wherein the control circuit is configured to output signals to the bridge driver circuit that cause the bridge driver circuit to alter the control signals provided to the inverter bridge.

6. A monitoring system according to claim 1, wherein the at least one ripple parameter includes a first ripple parameter indicative of whether a fault is present that is indicative of a first predetermined loss of capacitance in the DC link capacitor circuit.

7. A monitoring system according to claim 6, wherein the at least one ripple parameter includes a second ripple parameter indicative of whether a fault is present that corresponds to a second predetermined loss of capacitance in the DC link capacitor circuit.

8. A monitoring system according to claim 6, wherein the first predetermined loss of capacitance is equivalent to the loss of capacitance of an integer number of DC link capacitors.

9. A monitoring system according to claim 1, wherein the monitoring circuit includes a true RMS-to-DC converter.

10. A monitoring system according to claim 1, wherein the ripple value is proportional to an RMS value of the ripple voltage.

11. A method of determining an operational state of a motor drive circuit of the kind comprising:
  a DC power supply;
  an inverter bridge including a plurality of bridge switches selectively connecting phases of a multi-phase electric motor to the DC power supply, the multi-phase electric motor being configured to provide power-assistance to a steering system of a vehicle;
  a bridge driver circuit for providing control signals to the inverter bridge;
  a DC link capacitor circuit interposed between the DC power supply and the inverter bridge, the DC link capacitor circuit including at least one DC link capacitor;

the method comprising the steps of:
  a monitoring step of monitoring a ripple value indicative of a ripple voltage in an output of the DC power supply;
  a comparison step of comparing the ripple value with at least one ripple parameter indicative of a fault in the DC link capacitor circuit; and
  a fault determination step wherein, when the ripple value is indicative of a fault in the DC link capacitor circuit, determining that a fault is present.

12. An electric power-assisted steering system comprising:
  a DC power supply;
  an inverter bridge including a plurality of bridge switches for selectively connecting phases of a multi-phase electric motor to the DC power supply, the multi-phase electric motor being configured to provide power-assistance to a steering system of a vehicle;
  a bridge driver circuit for providing control signals to the inverter bridge;
  a DC link capacitor circuit interposed between the DC power supply and the inverter bridge, the DC link capacitor circuit including at least one DC link capacitor; and
  a monitoring system comprising:
    a monitoring circuit configured to monitor the DC link capacitor circuit, the monitoring circuit outputting a ripple value indicative of a ripple voltage in an output of the DC power supply; and
    comparison means for comparing the ripple value with at least one ripple parameter indicative of a fault in the DC link capacitor circuit and determining whether a fault is present.

13. An electric power-assisted steering system according to claim 12, further comprising at least one additional inverter bridge for selectively connecting additional phases of the multi-phase electric motor to the DC power supply.

14. An electric power-assisted steering system according to claim 13, further comprising an additional bridge driver circuit for providing control signals to the additional inverter bridge, the additional bridge driver circuit receiving signals from the monitoring system.

15. An electric power-assisted steering system according to claim 14, wherein the bridge driver circuit and/or the additional bridge driver circuit are configured to modify the control signals provided to the inverter bridge and/or the additional inverter bridge when it is determined by the monitoring system that a fault is present in the DC link capacitor circuit.

* * * * *